Feb. 28, 1928.  
L. A. OSGOOD  
WEIGHING SCALE  
Filed Dec. 3, 1923  
1,660,681  
2 Sheets-Sheet 1
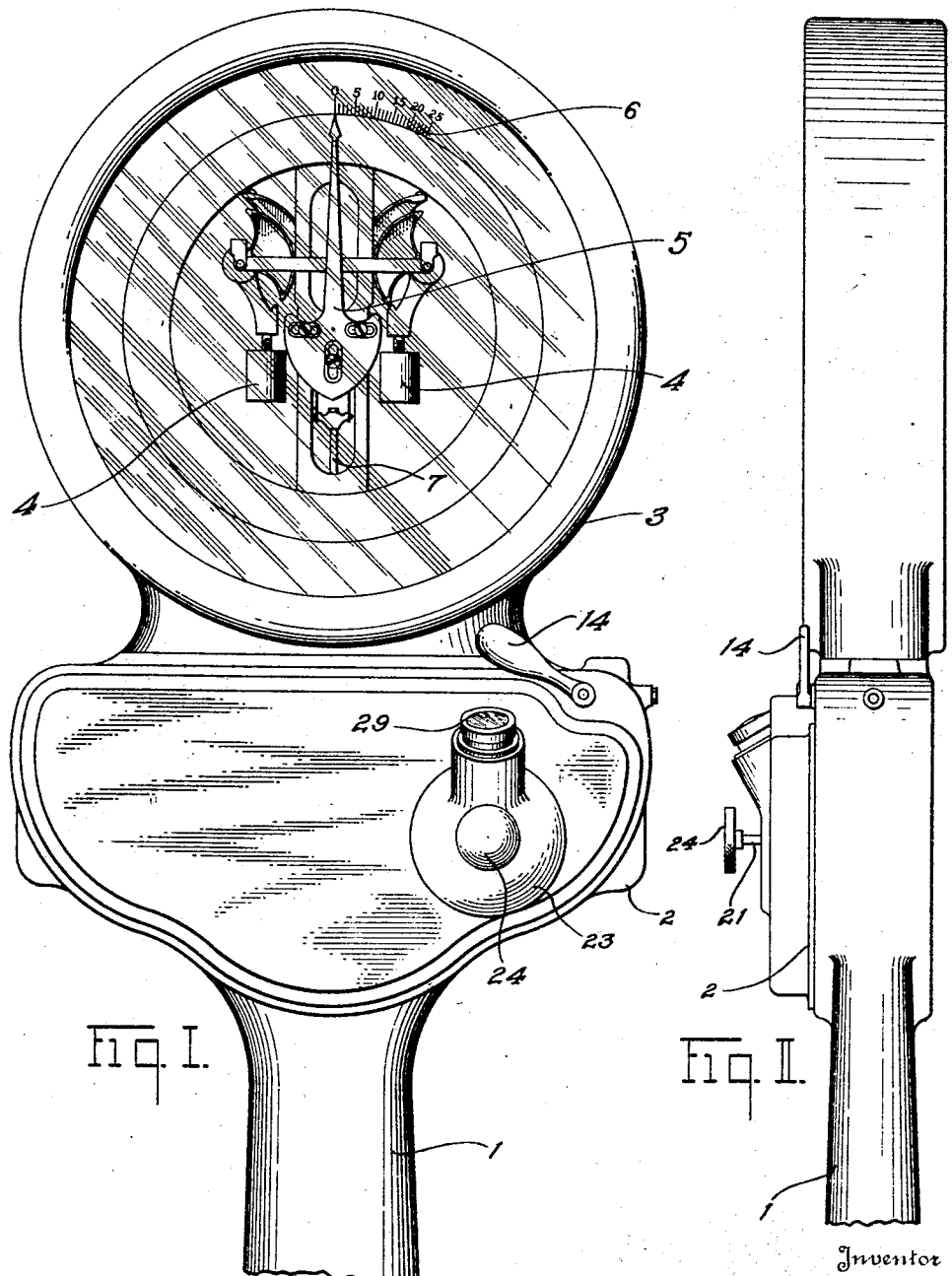
Inventor  
LOUIS A. OSGOOD  
By C. P. Marshall  
Attorney Feb. 28, 1928.
L. A. OSGOOD
1,660,681
WEIGHING SCALE
Filed Dec. 3, 1923
2 Sheets-Sheet 2
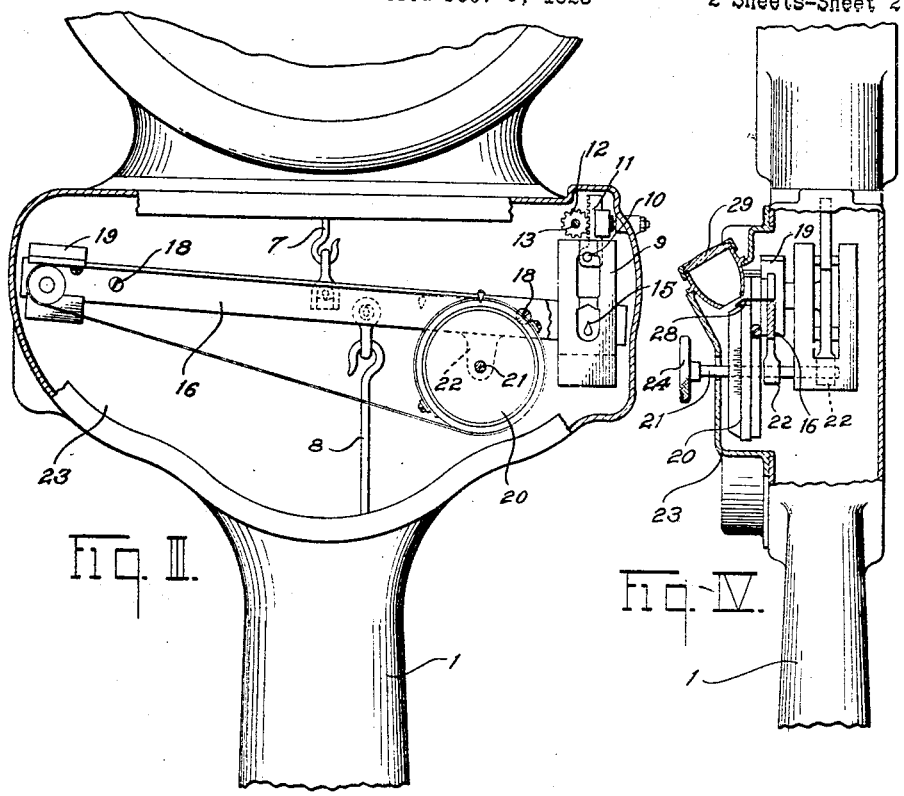
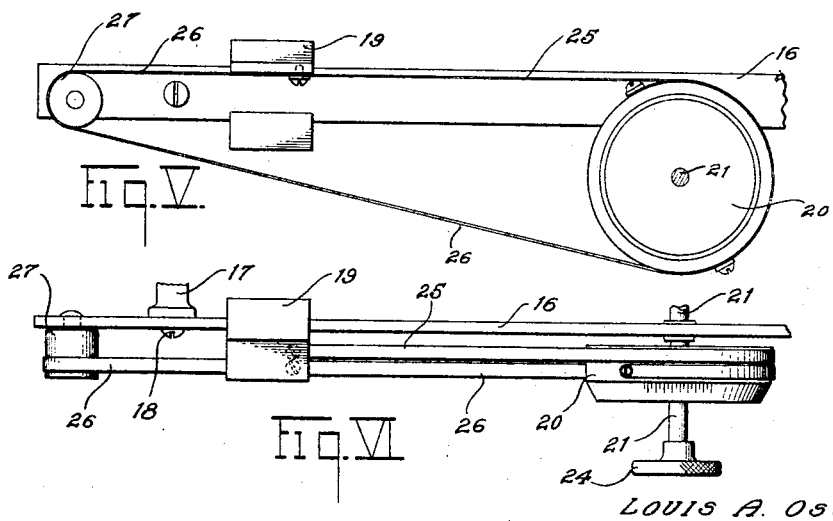
Inventor
LOUIS A. OSGOOD
Attorney Patented Feb. 28, 1928.

1,660,681

UNITED STATES PATENT OFFICE.

LOUIS A. OSGOOD, OF HARTFORD, CONNECTICUT, ASSIGNOR TO TOLEDO SCALE COMPANY, OF TOLEDO, OHIO, A CORPORATION OF NEW JERSEY.

WEIGHING SCALE.

Application filed December 3, 1923. Serial No. 678,082.

This invention relates to weighing scales, and particularly to scales of the so-called heavy capacity type having auxiliary devices for counterbalancing trucks and other tare and for increasing the capacity of the scale.

The great weight of power operated trucks such as are employed in industrial and mercantile establishments and the great weight of motor trucks used for outside hauling make it necessary that the tare capacities of automatic scales used to weigh commodities carried by such trucks be very great. The automatic part of the scale which weighs and indicates the net load must, of course, be very sensitive and accurate, but it is also important that the tare be just as accurately indicated, because errors in indicating the tare are carried into the net weight. Suppose, for example, that in a given case the tare of a truck is taken at 3550 lbs. and the net weight indicated by the automatic mechanism is 217 lbs. If the tare is really 3554 lbs., the true net weight is only 213 lbs. No matter how accurate and sensitive the automatic mechanism may be, an error in the tare indication creates an equal and opposite error in the net weight indication.

One of the principal objects of this invention is to provide a scale having a tare device of large capacity with an indicator which may be read very accurately.

Another object of the invention is the provision of a device in which both the tare and net weights are readable upon dials;

Another object is the provision of a poise moving and tare indicating device which may be operated from the exterior of a housing enclosing the tare mechanism;

And still another object is the provision of a graduated circular dial connected to a poise in combination with magnifying lens co-operating with a dial to permit easy and accurate reading of the poise.

Other objects and advantages will be apparent from the following description, in which reference is had to the accompanying drawings illustrating a preferred embodiment and wherein similar reference numerals a designate similar parts throughout the several views.

In the drawings:—

Figure I is a front elevation view of a part of an automatic weighing scale, the load-receiving platform not being shown;

Figure II is a side elevation of the part of the scale shown in Figure I;

Figure III is a fragmentary elevational view of the housing enclosing the beam and associated mechanism, parts being broken away;

Figure IV is a fragmentary side elevational view of the same part of the scale, parts being broken away;

Figure V is an enlarged fragmentary front elevation showing a beam, poise and dial forming elements of my invention; and Figure VI is a plan view thereof.

In the scale illustrated in the drawings, the tare and net weight counterbalancing and indicating mechanism are supported upon a column 1, the upper end 2 of which is enlarged to contain the tare counterbalancing and indicating mechanism, while the automatic net weight counterbalancing and indicating mechanism is enclosed in a substantially watch-case-shaped housing 3 mounted upon the upper end of the column. The automatic net weight counterbalancing and indicating mechanism may be of any specific type, but I have shown for illustrative purposes the well known Toledo type of mechanism, consisting of a pair of oppositely acting pendulums 4 connected to an indicator hand 5 which, when the pendulums swing outwardly to counterbalance a load, moves to indicating position over a suitably graduated chart 6.

From the automatic net weight counterbalancing mechanism a link 7 (see Figures I and III) extends downwardly to a tare beam lever, which is in turn connected by means of a link 8 to the platform lever mechanism (not shown).

A unit weight 9 is suspended within the enlarged upper end 2 of the column upon a pin 10 carried by the lower end of a rack 11 which meshes with a pinion 12 fixed upon a rock shaft 13 that projects through the front of the casing and is equipped with a handle 14. By turning the handle 14 to the right the rack is lowered and the unit weight thus dropped upon a pivot 15 on the tare beam lever, where it counterbalances a part of the load on the platform. The unit weight may be of any desired mass, but it is preferably large enough to counterbalance a load on the platform equal to the capacity of the chart 6, so that the capacity of the scale is doubled by dropping a weight upon the tare beam lever.

A tare beam 16 is fixed, by means of bosses 17 and screws 18, to the tare beam lever, and slidably mounted upon the tare beam is a poise 19 adapted to be set at various positions along the beam for counterbalancing various tare weights. In order that the tare poise may be capable of counterbalancing heavy trucks, etc., it is necessary, unless a very long beam be employed, that the poise be very heavy. A slight change in the position of the heavy poise, therefore, corresponds to a large difference in the weight of the truck or container, but by the device of my invention the poise may be easily and accurately set and its position easily and accurately read.

The poise setting and indicating device consists of a drum 20 fixed upon a shaft 21 which is journaled in bosses 22 projecting downwardly from the tare beam and tare beam lever. The forward end of the shaft 21 projects through the front of a casing cover 23 which is applied to the enlarged upper end 2 of the column 1, and an operating knob 24 is fixed upon the projecting end of the shaft.

A flexible metallic band or ribbon 25 is fastened at one end of the poise 19, while its other end overlies and is attached to the drum 20. By turning the knob 24 to the right the poise 19 may thus be drawn to the right along the beam 16. A second metallic ribbon 26 is attached at one end to the poise 19 and extends to the left over a pulley 27 and thence to the right, its other end winding about the drum beside the end of the ribbon 25 but in the opposite direction and being secured to the drum. When the knob 24 is turned to the left the poise 19 is moved to the left along the beam by means of the ribbon 26. As the ribbons 25 and 26 pull against each other, both remain taut in all positions of the poise.

The front end of the drum 20 is beveled, as shown in Figures IV and VI, and the beveled portion is graduated to form an indicator or dial which co-operates with a pointer 28 fixed to the beam 16.

Mounted in the cover 23 in position to admit light to the portion of the dial adjacent the pointer 28 and to act as a reading lens for the indication is a magnifying glass 29. With the aid of the magnifying glass the position of the poise may be read with great ease and accuracy. The movement of the poise may be caused to move the indicator to any desired extent by merely increasing the size of the dial or decreasing the relative size of the portion of the drum on which the ribbons are wound.

The embodiment of my invention herein shown and described is to be regarded as illustrative only, and it is to be understood that the invention is susceptible to variation, modification and change within the spirit and scope of the subjoined claims.

Having described my invention, I claim:

1. In a device of the class described, in combination, a beam, a poise slidably mounted thereon, a poise operating drum, flexible members connecting said drum and said poise, an indicating dial on said drum, and a magnifying reading lens for said dial.

2. In a device of the class described, in combination, a casing, a beam housed therein, a poise slidably mounted on said beam, a poise operating device having a handle located exteriorly of said casing, means for indicating the position of said poise connected to said poise operating device, and a magnifying reading lens for said indicating means.

3. In a device of the class described, in combination, a casing, a beam housed therein, a poise slidably mounted on said beam, a dial housed within said casing and adapted to indicate the position of said poise on said beam, and a magnifying reading lens through which said dial may be read from outside said casing.

4. In a device of the class described, in combination, a casing, a beam housed therein, a poise slidably mounted on said beam, a poise operating drum mounted within said casing, means connecting said poise and said drum, an indicating dial on said drum, and a magnifying reading lens through which said dial is readable from outside said casing.

5. In a device of the class described, in combination, a casing, a beam housed therein, a poise slidably mounted on said beam, an operating drum for said poise mounted within said casing, flexible means connecting said poise and said drum, an operating handle located exteriorly of said casing and connected to said drum, an indicating dial on said drum, and a magnifying reading lens through which said dial may be read from outside of said casing.

6. In a device of the class described, in combination, a casing, a beam housed therein, a poise slidably mounted on said beam, a poise operating drum carried by said beam, flexible means connecting said drum and said poise, said drum having a beveled edge at one of its ends, indicating marks on said beveled edge, and a magnifying reading lens through which said marks are readable from the outside of said casing.

7. In a device of the class described, in combination, a casing, weighing mechanism housed therein, said weighing mechanism including a lever, a unit weight and means operable from outside said casing for depositing said unit weight on said lever, a beam carried by said lever, a poise slidably mounted on said beam, a poise operating device including an indicating dial, and means for manipulating said poise operating device from outside said casing.

8. In a device of the class described, in combination, a casing, weighing mechanism housed therein, said weighing mechanism including a lever, a unit weight and means operable from outside said casing for depositing said unit weight on said lever, a beam carried by said lever, a poise slidably mounted on said beam, a poise operating device including an indicating dial located inside said casing, means for manipulating said poise operating device from outside said casing, and a magnifying reading lens through which said dial may be read from outside said casing.

9. In a device of the class described, in combination, a casing, automatic weighing mechanism mounted therein, beam weighing mechanism mounted in said casing and connected to said automatic weighing mechanism, said beam weighing mechanism including a lever, a unit weight and means operable from outside said casing for depositing said unit weight on said lever, a beam carried by said lever, a poise slidably mounted on said beam, a poise operating device including an indicating dial located inside said casing, means for manipulating said poise operating device from outside said casing, and a magnifying reading lens through which said dial may be read from outside said casing.

LOUIS A. OSGOOD.